US007484224B2

(12) United States Patent
Potter et al.

(10) Patent No.: US 7,484,224 B2
(45) Date of Patent: Jan. 27, 2009

(54) ADAPTER DEPLOYMENT WITHOUT RECYCLE

(75) Inventors: Timothy Potter, Denver, CO (US); Mitch Upton, Highlands Ranch, CO (US); Christa Golding, Littleton, CO (US); Rick DeGrande, Littleton, CO (US)

(73) Assignee: BAE Systems, Inc., Redwood Shores, CA (US)

( * ) Notice: Subject to any disclaimer, the term of this patent is extended or adjusted under 35 U.S.C. 154(b) by 876 days.

(21) Appl. No.: 10/400,822

(22) Filed: Mar. 27, 2003

(65) Prior Publication Data

US 2004/0010631 A1 Jan. 15, 2004

Related U.S. Application Data

(60) Provisional application No. 60/377,303, filed on May 2, 2002.

(51) Int. Cl.
*G06F 9/00* (2006.01)
(52) U.S. Cl. ...................................... 719/328; 717/102
(58) Field of Classification Search ................. 719/328, 719/331, 332; 717/162–164, 102
See application file for complete search history.

(56) References Cited

U.S. PATENT DOCUMENTS

| 5,321,841 | A | 6/1994 | East et al. ................ 395/725 |
| 5,469,562 | A | 11/1995 | Saether |
| 5,604,860 | A | 2/1997 | McLaughlin et al. |
| 5,630,131 | A | 5/1997 | Palevich et al. |
| 5,748,975 | A | 5/1998 | Van De Vanter ............ 395/793 |
| 5,801,958 | A | 9/1998 | Dangelo et al. |
| 5,835,769 | A | 11/1998 | Jervis et al. ................ 395/701 |
| 5,836,014 | A | 11/1998 | Faiman, Jr. ................ 395/707 |
| 5,862,327 | A | 1/1999 | Kawang et al. ........ 395/200.33 |

(Continued)

FOREIGN PATENT DOCUMENTS

CA        2248634        3/2000

(Continued)

OTHER PUBLICATIONS

Hp, "hp application server" developer's guide, version 8.0, 1999-2001, p. 27-81, 127 160, 195-271.*

(Continued)

*Primary Examiner*—Meng-Ai An
*Assistant Examiner*—Phuong N Hoang
(74) *Attorney, Agent, or Firm*—Fliesler Meyer LLP

(57) ABSTRACT

An adapter can be deployed into a system in a single step without recycle. An adapter can contain components, such as an integration adapter, event router, and resource adapter, which all conform to a given specification such that these components use some of the same classes. A class loader allows these components to share common classes, instead of having separate classes. A single Enterprise archive file contains files necessary to deploy the adapter, such as Web archive files, resource adapter archive files, event router Web application files, and shared Java archive files. The inclusion of these files in an Enterprise archive file allows all components for the adapter to be deployed in a single step without the need to recycle.

This description is not intended to be a complete description of, or limit the scope of, the invention. Other features, aspects, and objects of the invention can be obtained from a review of the specification, the figures, and the claims.

14 Claims, 2 Drawing Sheets

U.S. PATENT DOCUMENTS

| | | | |
|---|---|---|---|
| 5,867,822 A | 2/1999 | Sankar | |
| 5,933,838 A | 8/1999 | Lomet | 707/202 |
| 5,944,794 A | 8/1999 | Okamoto et al. | |
| 5,950,010 A | 9/1999 | Hesse et al. | 395/712 |
| 5,961,593 A | 10/1999 | Gabber et al. | 709/219 |
| 5,966,535 A | 10/1999 | Bendikt et al. | |
| 6,012,083 A | 1/2000 | Savitzky et al. | |
| 6,016,495 A | 1/2000 | McKeehan et al. | |
| 6,018,730 A | 1/2000 | Nichols et al. | |
| 6,023,578 A | 2/2000 | Birsan et al. | |
| 6,023,722 A | 2/2000 | Colyer | 709/201 |
| 6,028,997 A | 2/2000 | Leymann et al. | 395/701 |
| 6,029,000 A | 2/2000 | Woolsey et al. | |
| 6,044,217 A | 3/2000 | Brealey et al. | 395/701 |
| 6,067,548 A | 5/2000 | Cheng | 707/103 |
| 6,067,623 A | 5/2000 | Blakley, III et al. | 713/201 |
| 6,070,184 A | 5/2000 | Blount et al. | |
| 6,085,030 A | 7/2000 | Whitehead et al. | 395/200.33 |
| 6,092,102 A | 7/2000 | Wagner | |
| 6,119,149 A | 9/2000 | Notani | 709/205 |
| 6,141,686 A | 10/2000 | Jackowski et al. | 709/224 |
| 6,141,701 A | 10/2000 | Whitney | |
| 6,148,336 A | 11/2000 | Thomas et al. | |
| 6,185,734 B1 | 2/2001 | Saboff et al. | |
| 6,212,546 B1 | 4/2001 | Starkovich et al. | |
| 6,222,533 B1 | 4/2001 | Notani et al. | |
| 6,226,675 B1 | 5/2001 | Meltzer et al. | 709/223 |
| 6,230,287 B1 | 5/2001 | Pinard et al. | 714/31 |
| 6,230,309 B1 | 5/2001 | Turner et al. | |
| 6,237,135 B1 | 5/2001 | Timbol | 717/1 |
| 6,243,737 B1 | 6/2001 | Flanagan et al. | |
| 6,256,676 B1 | 7/2001 | Taylor et al. | |
| 6,282,561 B1 | 8/2001 | Jones et al. | |
| 6,282,711 B1 | 8/2001 | Halpern et al. | 717/11 |
| 6,292,932 B1 | 9/2001 | Baisley et al. | |
| 6,311,327 B1 | 10/2001 | O'Brien et al. | |
| 6,324,681 B1 | 11/2001 | Sebesta et al. | |
| 6,330,569 B1 | 12/2001 | Baisley et al. | |
| 6,334,114 B1 | 12/2001 | Jacobs et al. | |
| 6,336,122 B1 | 1/2002 | Lee et al. | 707/204 |
| 6,338,064 B1 | 1/2002 | Ault et al. | 707/9 |
| 6,343,265 B1 | 1/2002 | Glebov et al. | |
| 6,349,408 B1 | 2/2002 | Smith | 717/11 |
| 6,353,923 B1 | 3/2002 | Bogle et al. | 717/4 |
| 6,360,358 B1 | 3/2002 | Elsbree et al. | |
| 6,367,068 B1 | 4/2002 | Vaidyanathan et al. | |
| 6,377,939 B1 | 4/2002 | Young | |
| 6,393,605 B1 | 5/2002 | Loomans | 717/121 |
| 6,408,311 B1 | 6/2002 | Baisley et al. | |
| 6,411,698 B1 | 6/2002 | Bauer et al. | |
| 6,445,711 B1 | 9/2002 | Scheel et al. | |
| 6,463,503 B1 | 10/2002 | Jones et al. | 711/114 |
| 6,470,364 B1 | 10/2002 | Prinzing | |
| 6,516,322 B1 | 2/2003 | Meredith | |
| 6,560,636 B2 | 5/2003 | Cohen et al. | |
| 6,560,769 B1 | 5/2003 | Moore et al. | |
| 6,567,738 B2 | 5/2003 | Gopp et al. | |
| 6,584,454 B1 | 6/2003 | Hummel et al. | |
| 6,594,693 B1 | 7/2003 | Borwankar | 709/219 |
| 6,594,700 B1 | 7/2003 | Graham et al. | |
| 6,601,113 B1 | 7/2003 | Koistinen et al. | |
| 6,604,198 B1 | 8/2003 | Beckman et al. | 713/167 |
| 6,609,115 B1 | 8/2003 | Mehring et al. | |
| 6,615,258 B1 | 9/2003 | Barry et al. | |
| 6,636,491 B1 | 10/2003 | Kari et al. | |
| 6,637,020 B1 | 10/2003 | Hammond | |
| 6,643,652 B2 | 11/2003 | Helgeson et al. | |
| 6,654,932 B1 | 11/2003 | Bahrs et al. | |
| 6,662,357 B1 | 12/2003 | Bowman-Amuah | |
| 6,678,518 B2 | 1/2004 | Eerola | |
| 6,684,388 B1 | 1/2004 | Gupta et al. | |
| 6,687,702 B2 | 2/2004 | Vaitheeswaran et al. | |
| 6,687,848 B1 | 2/2004 | Najmi | |
| 6,721,740 B1 | 4/2004 | Skinner et al. | |
| 6,721,777 B1* | 4/2004 | Sharma | 718/101 |
| 6,721,779 B1 | 4/2004 | Maffeis | |
| 6,732,237 B1 | 5/2004 | Jacobs et al. | 711/119 |
| 6,748,420 B1 | 6/2004 | Quatrano et al. | |
| 6,754,884 B1 | 6/2004 | Lucas et al. | |
| 6,757,689 B2 | 6/2004 | Battas et al. | |
| 6,789,054 B1 | 9/2004 | Makhlouf | |
| 6,795,967 B1 | 9/2004 | Evans et al. | 719/310 |
| 6,799,718 B2 | 10/2004 | Chan et al. | |
| 6,802,000 B1 | 10/2004 | Greene et al. | 713/168 |
| 6,804,686 B1 | 10/2004 | Stone et al. | 707/104.1 |
| 6,823,495 B1 | 11/2004 | Vedula et al. | |
| 6,832,238 B1 | 12/2004 | Sharma et al. | |
| 6,836,883 B1 | 12/2004 | Abrams et al. | |
| 6,847,981 B2 | 1/2005 | Song et al. | |
| 6,850,979 B1 | 2/2005 | Saulpaugh et al. | |
| 6,859,180 B1 | 2/2005 | Rivera | |
| 6,874,143 B1 | 3/2005 | Murray et al. | |
| 6,889,244 B1 | 5/2005 | Gaither et al. | |
| 6,915,519 B2 | 7/2005 | Williamson et al. | |
| 6,918,084 B1 | 7/2005 | Slaughter et al. | |
| 6,922,827 B2 | 7/2005 | Vasilik et al. | |
| 6,950,872 B2 | 9/2005 | Todd, II | |
| 6,959,307 B2 | 10/2005 | Apte | |
| 6,963,914 B1 | 11/2005 | Breitbart et al. | |
| 6,971,096 B1 | 11/2005 | Ankireddipally et al. | |
| 6,976,086 B2 | 12/2005 | Sadeghi et al. | |
| 7,000,219 B2 | 2/2006 | Barrett et al. | |
| 7,017,146 B2 | 3/2006 | Dellarocas et al. | |
| 7,043,722 B2 | 5/2006 | Bau, III | |
| 7,051,072 B2 | 5/2006 | Stewart et al. | |
| 7,051,316 B2 | 5/2006 | Charisius et al. | |
| 7,054,858 B2 | 5/2006 | Sutherland | |
| 7,062,718 B2 | 6/2006 | Kodosky et al. | |
| 7,069,507 B1 | 6/2006 | Alcazar et al. | |
| 7,072,934 B2 | 7/2006 | Helgeson et al. | |
| 7,073,167 B2 | 7/2006 | Iwashita | |
| 7,076,772 B2 | 7/2006 | Zatloukal | |
| 7,089,565 B2* | 8/2006 | Kan et al. | 719/315 |
| 7,089,584 B1* | 8/2006 | Sharma | 726/4 |
| 7,096,422 B2 | 8/2006 | Rothschiller et al. | |
| 7,107,578 B1 | 9/2006 | Alpern | |
| 7,111,243 B1 | 9/2006 | Ballard et al. | |
| 7,117,504 B2 | 10/2006 | Smith et al. | |
| 7,127,704 B2 | 10/2006 | Van De Vanter et al. | |
| 7,143,186 B2 | 11/2006 | Stewart et al. | |
| 7,146,422 B1 | 12/2006 | Marlatt et al. | |
| 7,155,705 B1 | 12/2006 | Hershberg et al. | |
| 7,165,041 B1 | 1/2007 | Guheen et al. | |
| 7,181,731 B2 | 2/2007 | Pace et al. | |
| 7,184,967 B1 | 2/2007 | Mital et al. | |
| 7,240,331 B2 | 7/2007 | Vion-Dury et al. | |
| 7,260,599 B2 | 8/2007 | Bauch et al. | |
| 7,260,818 B1 | 8/2007 | Iterum et al. | |
| 2002/0004848 A1 | 1/2002 | Sudarshan et al. | |
| 2002/0010781 A1 | 1/2002 | Tuatini | |
| 2002/0010803 A1 | 1/2002 | Oberstein et al. | |
| 2002/0016759 A1 | 2/2002 | Macready et al. | |
| 2002/0049788 A1 | 4/2002 | Lipkin et al. | |
| 2002/0073236 A1 | 6/2002 | Helgeson et al. | |
| 2002/0073396 A1 | 6/2002 | Crupi et al. | |
| 2002/0083075 A1 | 6/2002 | Brummel et al. | |
| 2002/0111922 A1 | 8/2002 | Young et al. | |
| 2002/0116454 A1 | 8/2002 | Dyla et al. | |
| 2002/0120685 A1 | 8/2002 | Srivastava et al. | |
| 2002/0143960 A1 | 10/2002 | Goren et al. | |
| 2002/0152106 A1 | 10/2002 | Stoxen et al. | |
| 2002/0161826 A1 | 10/2002 | Arteaga et al. | |
| 2002/0165936 A1 | 11/2002 | Alston et al. | |
| 2002/0169644 A1 | 11/2002 | Greene | |

| | | | |
|---|---|---|---|
| 2002/0174178 A1 | 11/2002 | Stawikowski | |
| 2002/0174241 A1 | 11/2002 | Beged-Dov et al. | |
| 2002/0184610 A1 | 12/2002 | Chong et al. | |
| 2002/0188486 A1 | 12/2002 | Gil et al. | |
| 2002/0194244 A1 | 12/2002 | Raventos | |
| 2002/0194267 A1 | 12/2002 | Flesner et al. | |
| 2002/0194495 A1 | 12/2002 | Gladstone et al. | |
| 2003/0004746 A1 | 1/2003 | Kheirolomoom et al. | |
| 2003/0005181 A1 | 1/2003 | Bau, III et al. | |
| 2003/0014439 A1 | 1/2003 | Boughannam | |
| 2003/0018661 A1 | 1/2003 | Daruger | |
| 2003/0018665 A1 | 1/2003 | Dovin et al. | |
| 2003/0018832 A1* | 1/2003 | Amirisetty et al. | 709/328 |
| 2003/0018963 A1 | 1/2003 | Ashworth et al. | |
| 2003/0023957 A1 | 1/2003 | Bau et al. | |
| 2003/0028579 A1 | 2/2003 | Kulkarni et al. | |
| 2003/0043191 A1 | 3/2003 | Tinsley et al. | |
| 2003/0046591 A1 | 3/2003 | Asghari-Kamrani et al. | |
| 2003/0051066 A1 | 3/2003 | Pace et al. | |
| 2003/0055868 A1 | 3/2003 | Fletcher et al. | |
| 2003/0055878 A1 | 3/2003 | Fletcher et al. | |
| 2003/0074217 A1 | 4/2003 | Beisiegel et al. | |
| 2003/0079029 A1 | 4/2003 | Garimella et al. | |
| 2003/0084203 A1* | 5/2003 | Yoshida et al. | 709/328 |
| 2003/0110117 A1 | 6/2003 | Saidenbereg et al. | |
| 2003/0110446 A1 | 6/2003 | Nemer | |
| 2003/0126136 A1 | 7/2003 | Omoigui | |
| 2003/0149791 A1 | 8/2003 | Kane et al. | |
| 2003/0167358 A1 | 9/2003 | Marvin et al. | |
| 2003/0196168 A1 | 10/2003 | Hu | |
| 2003/0233631 A1 | 12/2003 | Curry et al. | |
| 2004/0019645 A1 | 1/2004 | Goodman et al. | |
| 2004/0040011 A1 | 2/2004 | Bosworth et al. | |
| 2004/0068568 A1 | 4/2004 | Griffin et al. | |
| 2004/0078373 A1 | 4/2004 | Ghoneimy et al. | |
| 2004/0103406 A1 | 5/2004 | Patel | |
| 2004/0133660 A1 | 7/2004 | Junghuber et al. | |
| 2004/0148336 A1 | 7/2004 | Hubbard et al. | |
| 2004/0204976 A1 | 10/2004 | Oyama et al. | |
| 2004/0216086 A1 | 10/2004 | Bau | |
| 2004/0225995 A1 | 11/2004 | Marvin et al. | |
| 2004/0260715 A1 | 12/2004 | Mongeon et al. | |
| 2005/0050068 A1 | 3/2005 | Vaschillo et al. | |
| 2005/0278585 A1 | 12/2005 | Spencer | |
| 2006/0206856 A1 | 9/2006 | Breeden et al. | |
| 2006/0234678 A1 | 10/2006 | Juitt et al. | |
| 2007/0038500 A1 | 2/2007 | Hammitt et al. | |

FOREIGN PATENT DOCUMENTS

| | | |
|---|---|---|
| WO | WO 9923558 | 5/1999 |
| WO | WO 0029924 | 5/2000 |
| WO | WO 01/90884 A2 | 11/2001 |

OTHER PUBLICATIONS

Shannon, "Java 2 Platform Enterprise Edition Specification, Oct. 20, 2000, v1.3", chapters 1-11.*

Kunisetty, "Workflow Modeling and Simulation Using an Extensible Object-Oriented Knowledge Base Management System" CiteSeer, 1996, pp. 1-60.

Van Der Aalst et al., "Verification of XRL: An XML-Based Workflow Language" IEEE, Jul. 2001, pp. 427-432.

Blake, "Rule-Driven Coordination Agents: A Self-Configurable Agent Architecture for Distributed Control" IEEE, Mar. 2001; pp. 271-277.

Dahalin et al., "Workflow Interoperability Using Extensible Markup Language (XML)" IEEE, Jul. 2002; pp. 513-516.

"Introducing Microsoft DotNet"; by ChristopheLauer, Jul. 2, 2002: http://webarchive.org/web/20020702162429/http://www.freevbcode.com/ShowCode.asp?ID=2171; pp. 1-10.

C. Mohan et al.; "Aries: A Transaction Recovery Method Supporting Fine-Granularity Locking and Partial Rollbacks Using Write-Ahead Logging"; ACM Transactions on Database Systems, vol. 17, No. 1, Mar. 1992, pp. 94-162.

Marcello Mariucci; "Enterprise Application Server Development Environment", Overview. University of Stuttgart. Oct. 10, 2000; pp. 1-10.

Sun Microsystems; "Iplanet Application Server 6.0 White Paper" Technical Reference Guide; May 25, 2000l; all.

Ed Roman, Richard Oberg; "The Technical Benefits of EJB and J2EE Technologies over COM+ and Windows DNA"; Dec. 1999, 2-5.

Hewlett-Packard. "HP Application Server", technical guide version 8.0; 1999-2000.

Enrique Duvos and Azer Bestavros; "An Infrastructure for the Dynamic Distribution of Web Applications and Servers" Department of Computer Science, Boston University, Dec. 2000; pp. 4-12.

U.S. Appl. No. 10/400,821, filed Mar. 27, 2003, Timothy Potter et al.

U.S. Appl. No. 10/402,819, filed Mar. 28, 2003, Timothy Potter et al.

U.S. Appl. No. 10/402,825, filed Mar. 28, 2003, Timothy Potter et al.

Peltz, "Web Services Orchestration" Hewlett-Packard, Jan. 2003, 20 pages.

Muller, "Event-Oriented Dynamic Adaptation of Workflows: Model, Architecture and Implementation", 2002, 351 pages, University of Leipzig, Germany.

Allamaraju, et al., "Professional Java Server Programming J2EE 1.3 Edition", Sep. 2001, pp. 1009-1057, WROX.

Sharma, "J2EE Connector Architecture Specification, Version 1.0 Final Release", Java 2 Enterprise Edition, Aug. 2001, 90 pages, Sun Microsystems.

Liebmann, et al., "Adaptive Data Dissemination and Caching for Edge Service Architectures built with the J2EE", 2004 Symposium on Applied Computing, Nicosia, Cyprus, Mar. 14-17, 2004, ACM Press, pp. 1717-1724.

Microsoft, "Microsoft.net Framework", 2001, 54 pages, Microsoft Corporation.

Willink, "Meta-Compilation for C ++", Jan. 4, 2000, 379 pages, University of Surrey.

Alonso et al., "Advanced Transaction Models in Workflow Contexts", IEEE, Feb. 1996, Proceedings of 12th International Conference on Data Engineering, retrieved from: http://citeseer.ist.psu.edualonso96advanced.html, pp. 574-581.

Van Der Aalst et al., "XML Based Schema Definition for Support of Inter-Organizational Workflow", University of Colorado and University of Eindhoven report, 2000, retrieved from http://citeseer.ist.psu.edu/vanderaalst00mxl.html, 39 pages.

Plaindoux, "XML transducers in Java", May 2002, The Eleventh International World Wide Conference, retrieved from: http://www2002.org/CDROM/poster/132/index.html., 6 pages.

Bea Systems, Inc., "Transforming Data Using Xquery Mapper", Bea AquaLogic Service Bus 2.0 Documentation, 2006, 19 pages.

Stylus Studio, "Xquery Mapper", 2007, 6 pages, Stylus Studios.

Altova, "XML-toXML Mapping", 2007, 3 pages, Altova Map Force.

Jamper, "Jamper-Java XML Mapper", 2007, 4 pages, Sourceforge.

Bogunovic, "A Programming Model for Composing Data Flow Collaborative Applications", Proceedings of the IEEE International Conference on Engineering of Computer Based Systems, Mar. 7-12, 1999, pp. 106-112.

Sung et al., "A Multimedia Authoring Tool for the Internet", IEEE Transactions on Consumer Electronics, 1997. pp. 304-308.

Smith, et al. "Marching Towards a Software Reuse Future", ACM Ada Letters, Nov./Dec. 1994, pp. 62-72 vol. 14, No. 6.

Sosnoski, "XML and Java technologies: Data binding, Part 1: Code generation approaches—JAXB and more," IBM, Jan. 1, 2003, http://www-128.ibm.com/developerworks/library/x-databdopt/index.html, pp. 1-11.

Chen, et al., "eCo Architecture for Electronic Commerce Interoperability," CommerceNet eCo Framework Project, Jun. 29, 1999, CommerceNet, Inc., pp. 1-107.

Java Debug Interface—definition, retrieved form <URL http://java.sun.com/j2se/1.4.2/docs/guide/jpda/jdi/overview-summary.html on Feb. 21, 2007, pp. 1-3.

Kilgore, "Multi-Language, Open-Source Modeling Using the Microsoft .Net Architecture," Proceedings of the 2002 Winter Simulation Conference, Dec. 8-11, 2002, IEEE, vol. 1, pp. 629-633.

Embury, et al., "Assisting the Comprehension of Legacy Transactions," Proceedings of the Eighth Working Conference on Reverse Engineering, Oct. 2-5, 2001, pp. 345-354.

Mays, et al., "A Persistent Store for Large Shared Knowledge Bases," IEEE Transactions on Knowledge and Data Engineering, vol. 3, No. 1, Mar. 1991, pp. 33-41.

Tang, et al., "Integrating Remote Invocation and Distributed Shared State," Proceedings of the 18th International Parallel and Distributed Processing Symposium, (IPDPS '04), Apr. 26-30, 2004, 10 pages.

Supplementary European Search Report for EP 02784131.1 dated Aug. 8, 2007, 4 pages.

Paul, Laura Gibbone, "RosettaNet: Teaching business to work together", Oct. 1, 1999. http://www.developer.com/xml/article.php/616641.

* cited by examiner

ADAPTER DEPLOYMENT WITHOUT RECYCLE

CLAIM OF PRIORITY

This application claims priority to U.S. Provisional Patent Application No. 60/377,303, field May 2, 2002, entitled "ADAPTER DEPLOYMENT WITHOUT RECYCLE," which is hereby incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference.

U.S. Provisional Application No. 60/377,322 entitled "Application View Transactions," by Timothy Potter et al., filed May 2, 2002

U.S. Provisional Application No. 60/377,322 entitled "Modular Deployment of Applications," by Timothy Potter et al., filed May 2, 2002.

U.S. Provisional Application No. 60/377,322 entitled "Shared Common Connection Factory," by Timothy Potter et al., filed May 2, 2002.

FIELD OF THE INVENTION

The present invention relates to deployment of adapters in an integration system.

BACKGROUND

Existing integration systems allow a developer to add an adapter to the system. An adapter is a software component that provides an interface between an application and an integration server. A J2EE adapter is an adapter that conforms to the Java™ 2 Enterprise Edition specification set forth by Sun Microsystems, Inc., of Santa Clara, Calif. Such an adapter can be hosted in any J2EE-compliant application server. This allows a simple adapter to be used in a wide range of software environments.

A J2EE adapter can be used by a developer to deploy an application view, which allows an external client application to interface with an information system such as an Enterprise Information System (EIS). It is necessary for an adapter deployer to add Java archive (JAR) files for this adapter to the system classpath before the adapter can be used to deploy application views. This limitation, which can be due to the limitations of the connector classloader, requires the system to be recycled every time an adapter is added. This recycling, which typically requires a rebootimg of the system, leads to undesirable downtimes in the system.

BRIEF SUMMARY

Systems and methods in accordance with embodiments of the present invention can overcome deficiencies in existing integration systems by utilizing shared classes to allow for a single-step deployment without the need to recycle the system. An adapter can contain components, such as an integration adapter, event router, and resource adapter, that all conform to a given specification, such as the J2EE specification. An integration adapter component can allow users to browse documents and interfaces in the system, such as through a Web browser. An event router component can be used to route messages through the system. A resource adapter component can be used to implement the connector specification. Since these components conform to the same specification, the components will use some of the same classes, such as Java archive classes. A class loader can be used that allows these components to share common classes, instead of having separate classes. The class loader can use these shared classes to allow the components of the integration adapter to be deployed into the system without recycling the system.

A single Enterprise archive (EAR) file can be used, which can contain files necessary to deploy the integration adapter. These files can include Web archive files, resource adapter archive files, event router Web application files, and shared Java archive files. The inclusion of these files in a single Enterprise archive file can allow all components for the integration adapter to be deployed in a single step, without the need to recycle the system.

Other features, aspects, and objects of the invention can be obtained from a review of the specification, the figures, and the claims.

DETAILED DESCRIPTION

Figure 2:
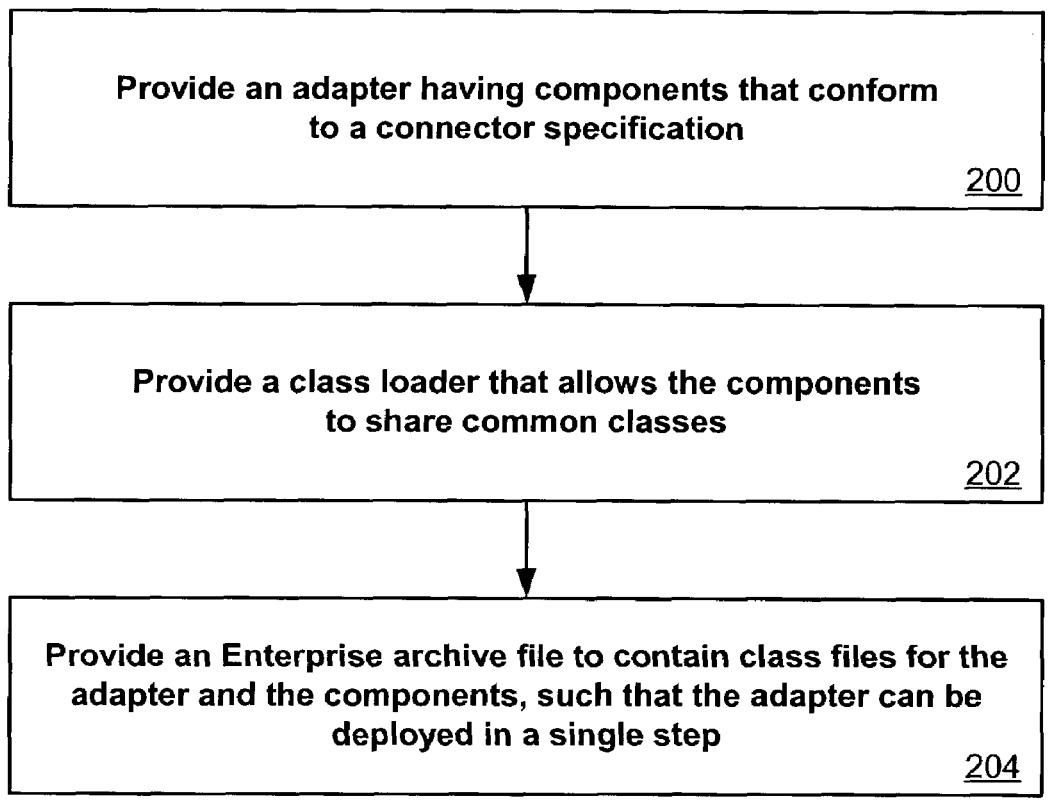
FIG. 2 is a diagram showing a process that can be used with the system of FIG. 1.

Systems and methods in accordance with embodiments of the present invention can provide for the deployment of adapters by providing the ability to have shared Java archive (JAR) files or resource adapters in a single Enterprise archive (EAR) file. As shown in the exemplary flowchart of FIG. 2, an adapter can be provided that contains components that conform to a given specification 200. Since the components conform to the same specification, the components can utilize some of the same classes or class files. A class loader can be provided that allows the components to share classes 202. An Enterprise archive file can be provided to contain the class files for the adapter and all adapter components, such that the adapter can be deployed in a single step without the need to recycle the system 204.

Figure 1:
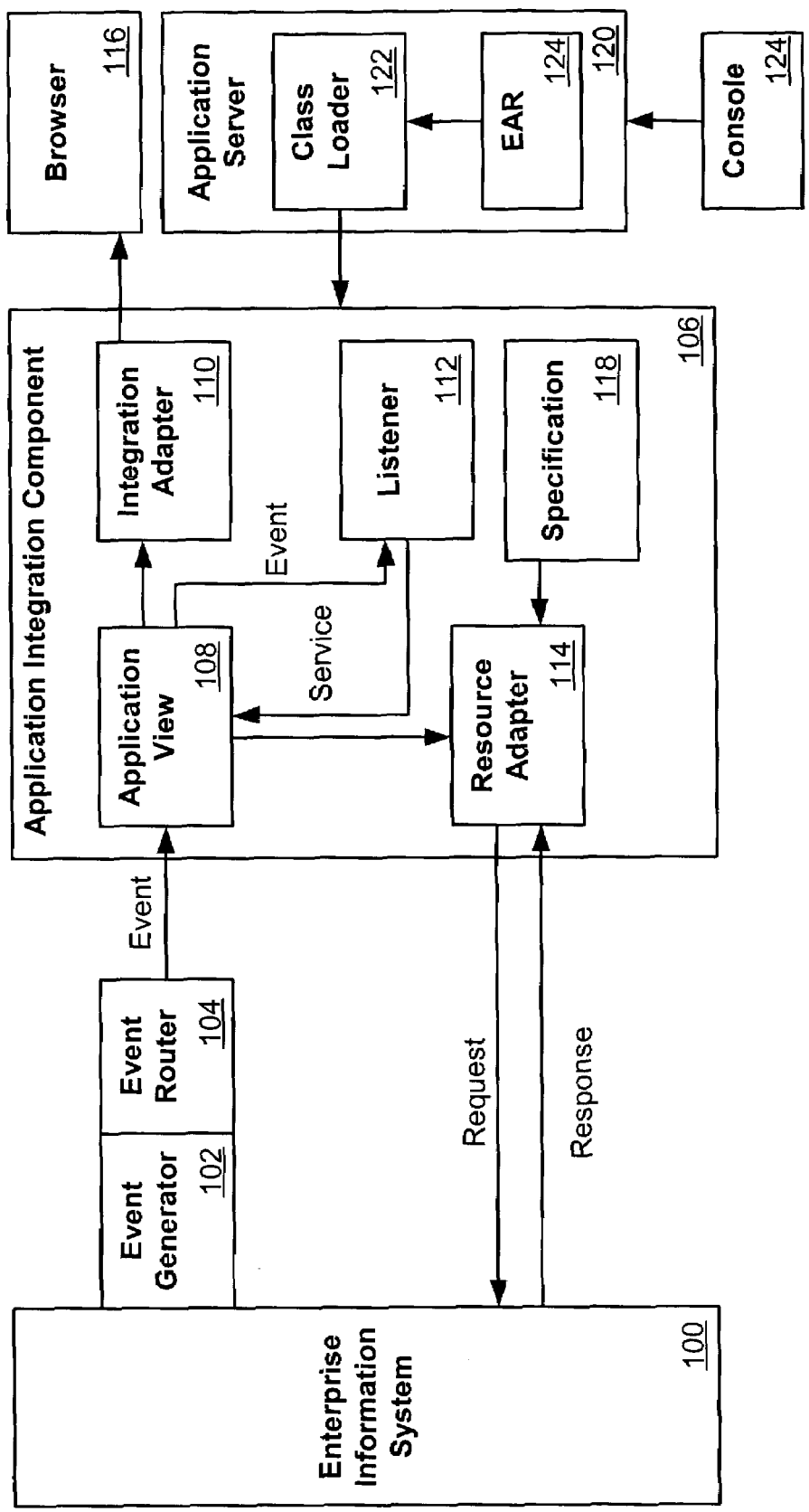
FIG. 1 is a diagram of a system that can be used in accordance with one embodiment of the present invention.

One such system is shown in FIG. 1. An integration adapter 110 can include a Web application that allows a user to browse documents or business programming application interfaces (BAPIs) that are available in an EIS system 100, such as an SAP system, through a Web browser 116 without the Web application. A resource adapter 114 can be used to send requests to, and receive requests from, the EIS 100. The resource adapter 114 can also be used to implement the connector specification 118. An event router 104, which can also be a Web application, can be used to route messages from the EIS 100 to an application view 108 for the application integration component 106.

When an event occurs in the EIS 100, an event generator 102 can detect the event and determine whether anyone should receive this event. To do this, the event generator 102 can check the types of events that have subscriptions, which can be maintained by the event router 104. The event router can create an event object containing pertinent data about the event, and can sends the event object to the event router 104. The event router 104 can send the event object to any application view 108 that is subscribed to the type of event object received from the event generator 102. The application view 108 can receive the event object and notify any listener 112 registered for that type of event. Exemplary listeners can include integration process flow or custom business logic flow. A listener 112 can process the event object and determine whether a service should be invoked in response to the event.

The application view 108 can combine data from the event object with data held by the application view, such as in state variables, and can make a service invocation on a resource adapter 114. The application view can accept the service request and determine which interaction to request on the resource adapter 114. This mapping from service name to adapter interaction can allow the service to be business-centric and not system-function centric. The resource adapter 114 can carry out the request interaction with the EIS 100 and pass the data received from the application view 108. This data can then be viewed, such as through a Web browser 116, through the integration adapter 110.

The integration adapter 110, resource adapter 114, and event router 104 are exemplary components that can conform to the J2EE standard. Since these components are part of the same adapter, they can have many components shared between them. A class loader 122 can be used, which can allow for the use of shared classes at the root of an EAR file 124. The sharing can result in a smaller EAR file. The use of shared classes also allows adapters to be deployed into the system without doing a recycle. Adapter deployers then do not need to add JAR files for an adapter to the system classpath. An adapter deployer can instead deploy an integration adapter from a system console, Web browser, Web application, or other interface. This deployment can be done without recycling the system server, or rebooting the server and recycling the services on that server.

An adapter development kit (ADK) can be used to show adapter developers how to load an adapter from an EAR file without restarting the server. This can be possible due to the use of a connector class loader 122 in the application server 120, for example. A single EAR file can contain the Web archive (WAR) and resource adapter archive (RAR) files, as well as the event router Web application files necessary to deploy an adapter. An example of an EAR file is shown by the following:

```
adapter.ear
    application.xml
    sharedJar.jar
    adapter.jar
    adapter.rar
        META-INF
            ra.xml
            system-ra.xml
            MANIFEST.MF
    designtime.war
        WEB-INF
            Web.xml
        META-INF
            MANIFEST.MF
    eventrouter.war
        WEB-INF
            Web.xml
        META-INF
            MANIFEST.MF
```

For example, a sample adapter EAR file can be given by:

```
sample.ear
    application.xml
    adk.jar (shared .jar between .war and .rar)
    bea.jar (shared .jar between .war and .rar)
            SAMPLE_ADK.jar (shared .jar between
.war and .rar)
            SAMPLE_ADK.war (Web application with
                META-INF/MANIFEST.MF entry Class-Path:
                SAMPLE_ADK.jar adk.jar bea.jar log4j.jar
                    logtoolkit.jar xcci.jar xmltoolkit.jar)
            SAMPLE_ADK.rar (Resource Adapter
                with META-INF/MANIFEST.MF entry Class-Path:
                SAMPLE_ADK.jar adk.jar bea.jar log4j.jar
                    logtoolkit.jar xcci.jar xmltoolkit.jar)
    log4j.jar (shared .jar between .war and .rar)
    logtoolkit.jar (shared .jar between .war and
    .rar)
    xcci.jar (shared .jar between .war and .rar)
    xmltoolkit.jar (shared .jar between .war and
    .rar)
```

Neither the RAR nor WAR files include any shared JAR files. Instead, both the RAR and WAR files refer to the shared JAR files off the root of the EAR.

Once an adapter has been created, the adapter can be deployed using an EAR file. EAR files can simplify adapter deployment by deploying all adapter components in a single step. An EAR file can be deployed from a server console 126 or manually, such as by manipulating the config.xml file.

Each adapter can be deployed from a single EAR file. The EAR file can contain the design-time Web application WAR file, the adapter RAR file, the adapter JAR file, and any shared JAR file required for deployment. It can also include an event router Web application file. This EAR file can be structured as:

```
adapter.ear
    application.xml
    sharedJar.jar
    adapter.jar
    adapter.rar
        META-INF
            ra.xml
            system-ra.xml
            MANIFEST.MF
    designtime.war
        WEB-INF
            Web.xml
        META-INF
            MANIFEST.MF
    eventrouter.war
        WEB-INF
            Web.xml
        META-INF
            MANIFEST.MF
```

For example, a sample adapter EAR file can be given by:

```
sample.ear
    application.xml
        adk.jar (shared .jar between .war and .rar)
        bea.jar (shared .jar between .war and .rar)
        SAMPLE_ADK.jar (shared .jar between .war and .rar)
```

```
SAMPLE_ADK.war (Web application with
        META-INF/MANIFEST.MF entry Class-Path:
    SAMPLE_ADK.jar adk.jar sys.jar log4j.jar
    logtoolkit.jar xcci.jar xmltoolkit.jar)
SAMPLE_ADK.rar (Resource Adapter with
        META-INF/MANIFEST.MF entry Class-Path:
    SAMPLE_ADK.jar adk.jar bea.jar log4j.jar
    logtoolkit.jar xcci.jar xmltoolkit.jar)
log4j.jar (shared .jar between .war and .rar)
logtoolkit.jar (shared .jar between .war and .rar)
xcci.jar (shared .jar between .war and .rar)
xmltoolkit.jar (shared .jar between .war and .rar)
```

Neither the RAR nor WAR files include the shared JAR files. Rather, the RAR and WAR files can refer to the shared JAR files by using an attribute such as <manifest.classpath>.

A design time can use an adapter's Service Provider Interface (SPI) classes in a non-managed scenario. Consequently, an adapter's SPI and Common Client Interface (CCI) classes can be contained in a shared JAR file off the root of the EAR. To allow the WAR and RAR classloaders to access the classes in the shared JAR, an entry can be made in the MANIFEST.MF files to include the shared JAR files.

An exemplary deployment descriptor for an EAR file is shown below. This descriptor can declare the components of the EAR file. In this case, that is the design-time WAR, event router WAR, and adapter RAR modules.

```
<!DOCTYPE application PUBLIC '-//DTD J2EE
    Application//EN'
    'http://example.com/dtd/application.dtd'>
    <application>
        <display-name>SAMPLE_ADK</display-name>
        <description>This is a J2EE application that
    contains a
                sample connector, Web application for configuring
                application views for the adapter, and an event
    router
                Web application.</description>
        <module>
                <connector>SAMPLE_ADK.rar</connector>
        </module>
        <module>
                <Web>
                    <Web-uri>SAMPLE_ADK.war</Web-uri>
                    <context-root>SAMPLE_ADK_Web</context-root>
                </Web>
        </module>
        <module>
                <Web>
                    <Web-uri>SAMPLE_ADK_Event-
                        Router.war</Web-uri>
                        <context-root>SAMPLE_ADK_
                        EventRouter
                        </context-root>
                </Web>
        </module>
</application>
```

The adapter JAR files can be on the system classpath. The adapter can be deployed through a server console or by adding an application component to config.xml.

The foregoing description of the preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for deploying an integration adapter, comprising:
    a resource adapter having components that conform to a connector standard;
    an Enterprise archive file containing class files for the components, such that the resource adapter can be deployed in a single step and;
    a class loader adapter to allow classes at the root of the Enterprise archive (EAR) file to be shared by another adapter
    an interface adapted to allow the resource adapter to be deployed without recycling the system and;
    wherein the resource adapter shares at least one class at the root of the Enterprise archive file with an integation adapter and an event router;
    wherein the enterprise archive file includes a Web Archive (WAR) file and a resource adapter archive (RAR) file which refer to the classes which are stored in a shared JAVA archive (JAR) file at the root the EAR and wherein neither of the RAR or WAR files contain any shared files; and;
    wherein the system runs on at least one procesor.

2. A computer-based system for deploying an adapter in an integration system, comprising:
    an integration adapter allowing users to browse documents interfaces in the system;
    an event router for routing messages through the system;
    a resource adapter for implementing a connector specification; and
    a class loader allowing for the use of shared classes;
    wherein the integration adapter, event router, and resource adapter have common components which can use the shared classes; and
    wherein the class loader can use the shared classes to allow the integration adapter, event router, and resource adapter to be deployed into the system without recycling the system and;
    wherein the resource adapter shares at least one class at the root of the Enterprise archive (EAR) file with an integation adapter and an event router;
    wherein the enterprise archive file includes a Web Archive (WAR) file and a resource adapter archive (RAR) file which refer to the classes which are stored in a shared JAVA archive (JAR) file at the root the EAR and wherein neither of the RAR or WAR files contain any shared files; and;
    wherein the system runs on at least one procesor.

3. A system according to claim 2, further comprising:
    start Enterprise archive (EAR) file for the integration adapter, the Enterprise archive file capable of containing files necessary to deploy the integration adapter.

4. A computer-based system according to claim 3, wherein: the class loader allows for the use of shared classes in the Enterprise archive (EAR) file.

5. A computer-based system according to claim 3, wherein: the Enterprise archive (EAR) file contains files selected from the group consisting of Web archive files, resource adapter archive files, event router Web application files, and shared Java archive files.

6. A computer-based system according to claim 3, wherein:
the Enterprise archive (EAR) file allows components for the integration adapter to be deployed in a single step.

7. A computer-based system according to claim 2, wherein:
the class loader allows for the use of shared classes selected from the group consisting of shared Java archive files and shared resource adapter files.

8. A computer-based system according to claim 2, wherein:
the integration adapter contains a Web application supporting the browsing of documents and interfaces.

9. A computer-based system according to claim 8, wherein:
the integration adapter allows viewing through a browser without the Web application.

10. A computer-based system according to claim 2, further comprising:
a system console allowing a user to deploy the adapter.

11. A computerized method for deploying an adapter, comprising:
providing an adapter having components that conform to a specification;
providing a class loader that allows the components to share classes; and
providing an Enterprise archive (EAR) file adapted to contain class files for the components, such that the adapter can be deployed in a single step, wherein the class loader is adapted to allow classes at the root of the Enterprise archive file to be shared by another adapter;
providing an interface adapted to allow the resource adapter to be deployed without recycling the system,
wherein the resource adapter shares at least one class at the root of the Enterprise archive file with an integration adapter and an event router;
wherein the enterprise archive file includes a Web Archive (WAR)file and a resource adapter archive (RAR) file which refer to the classes which are stored in a shared JAVA archive (JAR) file at the root the EAR and wherein neither of the RAR or WAR files contain any shared files.

12. A computer readable storage medium having computer codes for execution by a server computer for deploying an adapter, comprising:
computer code for providing an adapter having components that conform to a specification;
computer code for providing a class loader that allows the components to share classes; and
computer code for providing an Enterprise archive (EAR) file adapted to contain class files for the components, such that the adapter can be deployed in a single step, wherein the class loader is adapted to allow classes at the root of the Enterprise archive file to be shared by another adapter;
computer code for an interface adapted to allow the resource adapter to be deployed without recycling the system:
wherein the resource adapter shares at least one class at the root of the Enterprise archive file with an integration adapter and an event router;
wherein the enterprise archive file includes a Web Archive (WAR) file and a resource adapter archive (RAR) file which refer to the classes which are stored in a shared JAVA archive (JAR) file at the root the EAR and wherein neither of the RAR or WAR files contain any shared files.

13. A computer system comprising:
a processor;
object code executed by said processor, said object code configured to:
provide an adapter having components that conform to a specification;
provide a class loader that allows the components to share classes; and
provide an Enterprise archive (EAR) file adapted to contain class files for the components, such that the adapter can be deployed in a single step, wherein the class loader is adapted to allow classes at the root of the Enterprise archive file to be shared by another adapter;
provide for an interface adapted to allow the resource adapter to be deployed without recycling the system;
wherein the resource adapter shares at least one class at the root of the Enterprise archive file with an integration adapter and an event router;
wherein the enterprise archive file includes a Web Archive (WAR) file and a resource adapter archive (RAR) file which refer to the classes which are stored in a shared JAVA archive (JAR) file at the root the EAR and wherein neither of the RAR or WAR files contain any shared files.

14. A computer-readable storage medium having codes for execution by a computer, comprising:
a code segment including instructions to provide an adapter having components that conform to a specification;
a code segment including instructions to provide a class loader that allows the components to share classes; and
a code segment including instructions to provide an Enterprise archive file adapted to contain class files for the components, such that the adapter can be deployed in a single step, wherein the class loader is adapted to allow classes at the root of the Enterprise archive (EAR) file to be shared by another adapter;
a code segment including instructions to provide an interface adapted to allow the resource adapter to be deployed without recycling the system:
wherein the resource adapter shares at least one class at the root of the Enterprise archive file with an integration adapter and an event router;
wherein the enterprise archive file includes a Web Archive (WAR) file and a resource adapter archive (RAR) file which refer to the classes which are stored in a shared JAVA archive (JAR) file at the root the EAR and wherein neither of the RAR or WAR files contain any shared files.

* * * * *